United States Patent
Kwon

(10) Patent No.: US 6,323,607 B1
(45) Date of Patent: Nov. 27, 2001

(54) HORIZONTAL DRIVE CIRCUIT IN A DISPLAY DEVICE WHICH PROVIDES SURGE PROTECTION AND A METHOD THEREFOR

(75) Inventor: Sung-Tae Kwon, Suwon-si (KR)

(73) Assignee: Samsung Electronics Co., LTD, Suwon (KR)

( * ) Notice: Subject to any disclaimer, the term of this patent is extended or adjusted under 35 U.S.C. 154(b) by 0 days.

(21) Appl. No.: 09/222,322

(22) Filed: Dec. 29, 1998

(30) Foreign Application Priority Data

Dec. 30, 1997 (KR) .................................................. 97-42950

(51) Int. Cl.[7] ..................................................... H01J 29/70
(52) U.S. Cl. ............................ 315/411; 315/399; 315/407
(58) Field of Search .................................... 315/370, 408, 315/399, 402, 407, 411; H01J 29/70

(56) References Cited

U.S. PATENT DOCUMENTS 5,059,874 * 10/1991 Oliver .................................... 315/411
5,691,890 * 11/1997 Hyde ....................................... 363/89
5,952,795 * 9/1999 Kofune et al. ......................... 315/411
5,969,486 * 10/1999 Webb et al. ........................... 315/384

* cited by examiner

Primary Examiner—Don Wong
Assistant Examiner—Shih-Chao Chen
(74) Attorney, Agent, or Firm—Staas & Halsey, LLP

(57) ABSTRACT

A horizontal drive circuit for a video display device includes a switching device for switching according to a horizontal oscillation frequency generated by a horizontal oscillator and a surge protector, and a method therefor. A driving transformer has a primary winding connected to the switching means and a secondary winding. The secondary winding provides an amplified current according to the status of the switching device. A diode serves as the surge protection connected between the switching device and the primary winding of the driving transformer.

21 Claims, 3 Drawing Sheets

HORIZONTAL DRIVE CIRCUIT IN A DISPLAY DEVICE WHICH PROVIDES SURGE PROTECTION AND A METHOD THEREFOR

CROSS-REFERENCE TO RELATED APPLICATIONS

This application makes reference to, incorporates the same herein, and claims all benefits accruing under 35 U.S.C. §119 from the utility model application entitled Horizontal Drive Circuit in Display Apparatus filed with the Korean Industrial Property Office on Dec. 30, 1997 and duly assigned Serial No. 97-42950 by that Office.

BACKGROUND OF THE INVENTION

1. Field of the Invention

The present invention relates to a display device, and more particularly, to a horizontal drive circuit including means for preventing a surge voltage from occurring in a switching operation, and a method therefor.

2. Description of the Related Art

A monitor (or "display"), which is a peripheral device for a computer, exhibits as a picture a varying visual display of a signal received from a computer, so that a user can recognize the visual display. FIG. 1 is a block diagram of a display. Referring to FIG. 1, the monitor includes a microcomputer 20 for receiving a horizontal synchronizing signal H-Sync and a vertical synchronizing signal V-Sync from a video card 10 contained within a computer (not shown). The microcomputer 20 generates a control signal for controlling a monitor picture. The monitor also includes vertical and horizontal deflection circuits 30 and 40 for receiving the vertical and horizontal synchronizing signals V-Sync and H-Sync, respectively. The vertical and horizontal deflection circuits 30 and 40 perform vertical and horizontal deflections, respectively, so that an electron beam generated by an electron gun of a cathode ray tube 80 is sequentially deflected from the upper left portion of the cathode ray tube 80 to its lower right portion by a defection yoke (DY in FIG. 1), to thereby form the picture.

The display also includes a high voltage circuit 50 for supplying a high voltage to an anode of the cathode ray tube 80. The high voltage circuit 50 uses a retrace line pulse generated by the output of the horizontal deflection circuit 40. A video pre-amplifier 60 is also included in the monitor, for amplifying a low level of a video signal (R,G,B) transmitted from the video card 10 using a low-voltage amplifier, to thereby maintain a predetermined voltage level. The display further includes a video main amplifier 70 for amplifying the voltage amplified by the video pre-amplifier 60 to a signal of 40 to 60 Vpp, and for supplying energy to each pixel of the display.

This display device forms an image using the electron beam projected to its fluorescent screen. Here, a circuit for deflecting the electron beam is called a deflection circuit. Generally, the deflection mode is divided into electrostatic deflection, using an electric field, and electromagnetic deflection, using a magnetic field. Electromagnetic deflection is used, for example, in a TV in which a sawtooth current flows through horizontal and vertical coils to form pictures.

A general configuration of the horizontal deflection circuit (or "horizontal deflector") 40 is shown in FIG. 2. Referring to FIG. 2, the horizontal deflection circuit 40 includes a horizontal oscillation circuit 41 which generally uses a blocking oscillation circuits A horizontal drive circuit 42 of the horizontal deflection circuit 40 provides one-stage or two-stage current amplification using a transistor TR or a field effect transistor FET. The horizontal drive circuit 42 provides a gate current sufficient for turning on/off an output transistor of a horizontal output circuit 43 and performs waveform correction.

The horizontal output circuit 43 of the horizontal deflection circuit 40 generates a sawtooth current which flows through a deflection coil using a switching operation of a transistor. The horizontal deflection circuit 40 also includes a horizontal size controller 44, connected to the horizontal output circuit 43, to maintain a specific horizontal size of the picture of the display device.

The image resolution of a video display is determined by the bandwidth of the horizontal and vertical frequencies. Therefore, the horizontal deflector for deflecting the horizontal frequency is especially important when designing a high resolution video display. In particular, the transistor used for the horizontal output should be operated within a safe operation limit, considering the condition of the gate drive, the current and voltage of the collector, switching, etc. At the same time, to enhance the resolution of the monitor, the horizontal drive circuit requires a large current and high voltage together with a short rising time and falling time.

FIG. 3 illustrates the horizontal drive circuit 42 and horizontal output circuit 43 described above. The output of the horizontal oscillation circuit (or "horizontal oscillator") 41 is amplified by a field effect transistor (FET) Q1 whose output is supplied, through the horizontal output transformer "T," to a gate of the horizontal output transistor Q2.

The horizontal drive circuit 42 includes an FET Q1, an R-C circuit, a resistor R2, and the transformer T. The gate of the FET Q1 is connected to the output of the horizontal oscillator 41. The R-C circuit includes a resistor R1 and a capacitor C1 for regulating the peak pulse of the switching signal generated by the FET Q1. The resistor R2 introduces a source voltage Vcc. The transformer T induces the source voltage Vcc, supplied through the resistor R2, according to the switching signal of the FET Q1. The peak pulse of the switching signal is regulated by the R-C circuit with the resistor R1 and the capacitor C1.

The horizontal output circuit 43 includes a horizontal output transistor Q2, capacitors C2 and C3, a damping diode D1, and a deflection yoke DY. The horizontal output transistor Q2 performs a switching operation according to the voltage level supplied from the horizontal drive circuit 42. The capacitors C2 and C3 perform a charging and discharging operation in response to the switching of the horizontal output transistor Q2. The damping diode D1 serves as a damper according to the charging and discharging of the horizontal output transistor Q2. The deflection yoke DY generates a sawtooth current according to the charging and discharging of the capacitors C2 and C3.

The horizontal drive circuit 42 requires an enhanced specification of the FET Q1 to prevent the FET Q1 from being destroyed by an over-specification voltage.

SUMMARY OF THE INVENTION

It is an object of the present invention to protect a horizontal drive transistor of a horizontal drive circuit from an unexpected surge voltage.

It is another object of the present invention to provide a stabilizing drive circuit having a surge protect element without a high performance switching element.

Additional objects and advantages of the invention will be set forth in part in the description which follows and, in part, will be apparent from the description, or may be learned by practice of the invention.

The above and other objects of the present invention are achieved by providing a horizontal drive circuit for a video display. The horizontal drive circuit includes switching means, a driving transformer, and a surge protector. The switching means switches according to a horizontal oscillation frequency generated by a horizontal oscillator. The driving transformer has a primary winding connected the switching means and a secondary winding, the secondary winding providing an amplified current according to the status of the switching means. The surge protector is connected between the switching means and the primary winding of the driving transformer.

In a preferred embodiment of the invention, the surge protector is a diode.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENT

Figure 1:
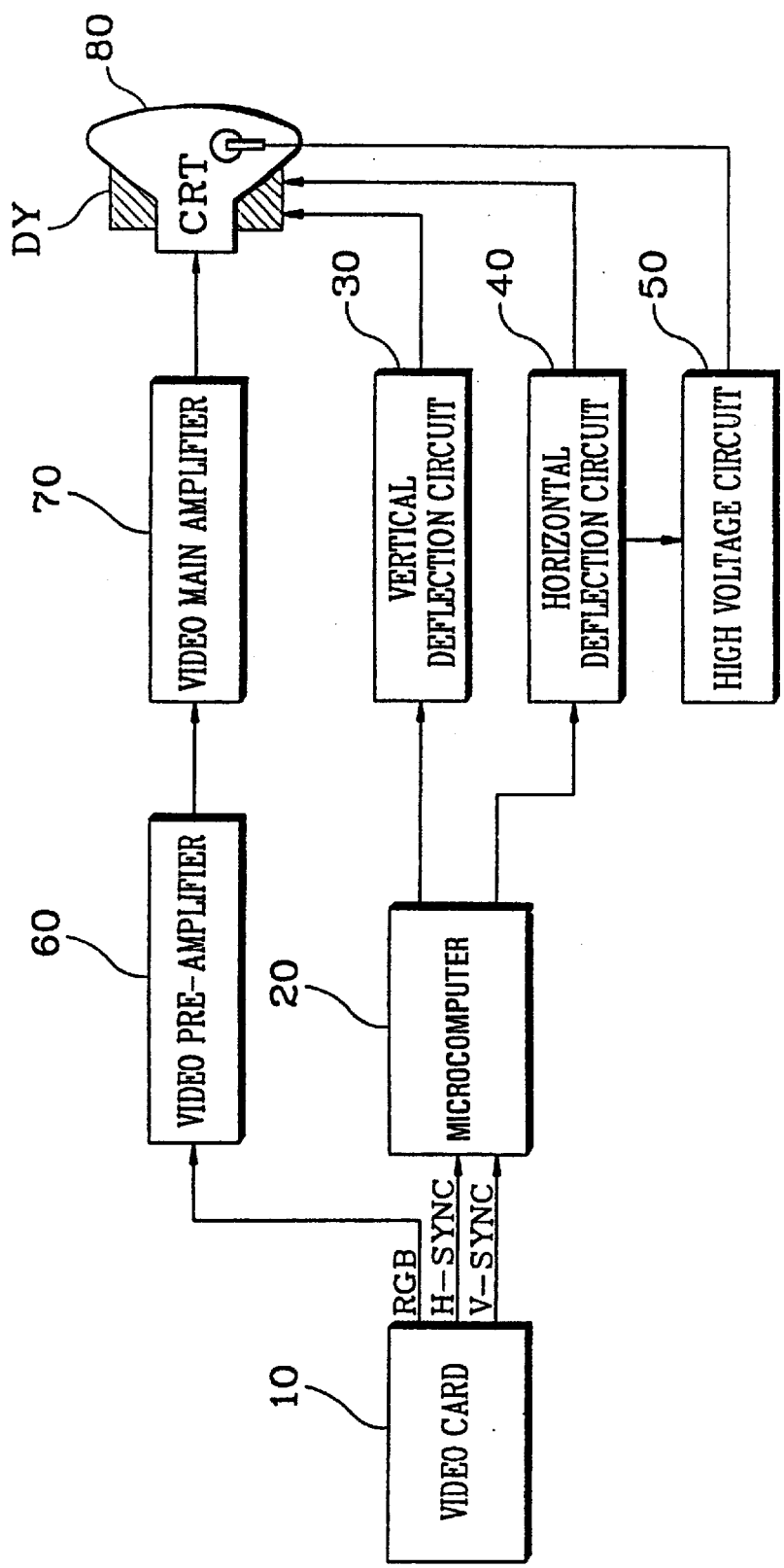
FIG. 1 is schematic diagram of a monitor.

Reference will now made in detail to the present preferred embodiment of the present invention, examples of which are illustrated in the accompanying drawings, wherein like reference numerals refer to like elements throughout. The embodiment is described below in order to explain the present invention by referring to the figures.

Figure 2:
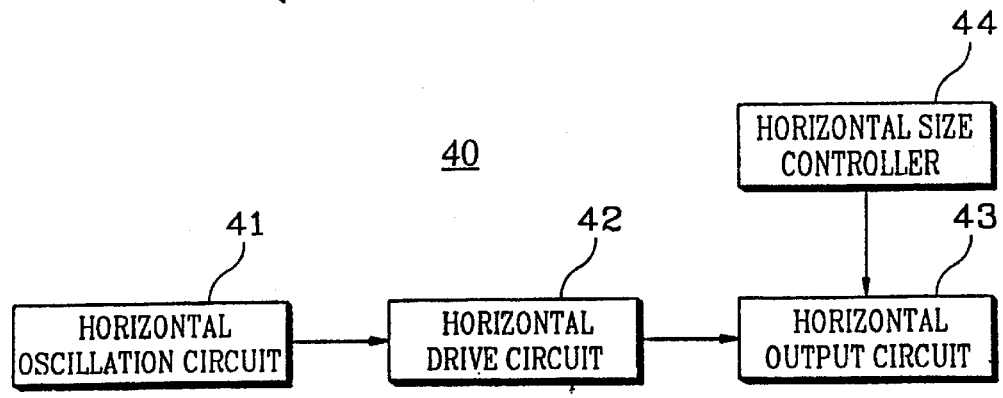
FIG. 2 illustrates a horizontal deflection circuit.
Figure 4:
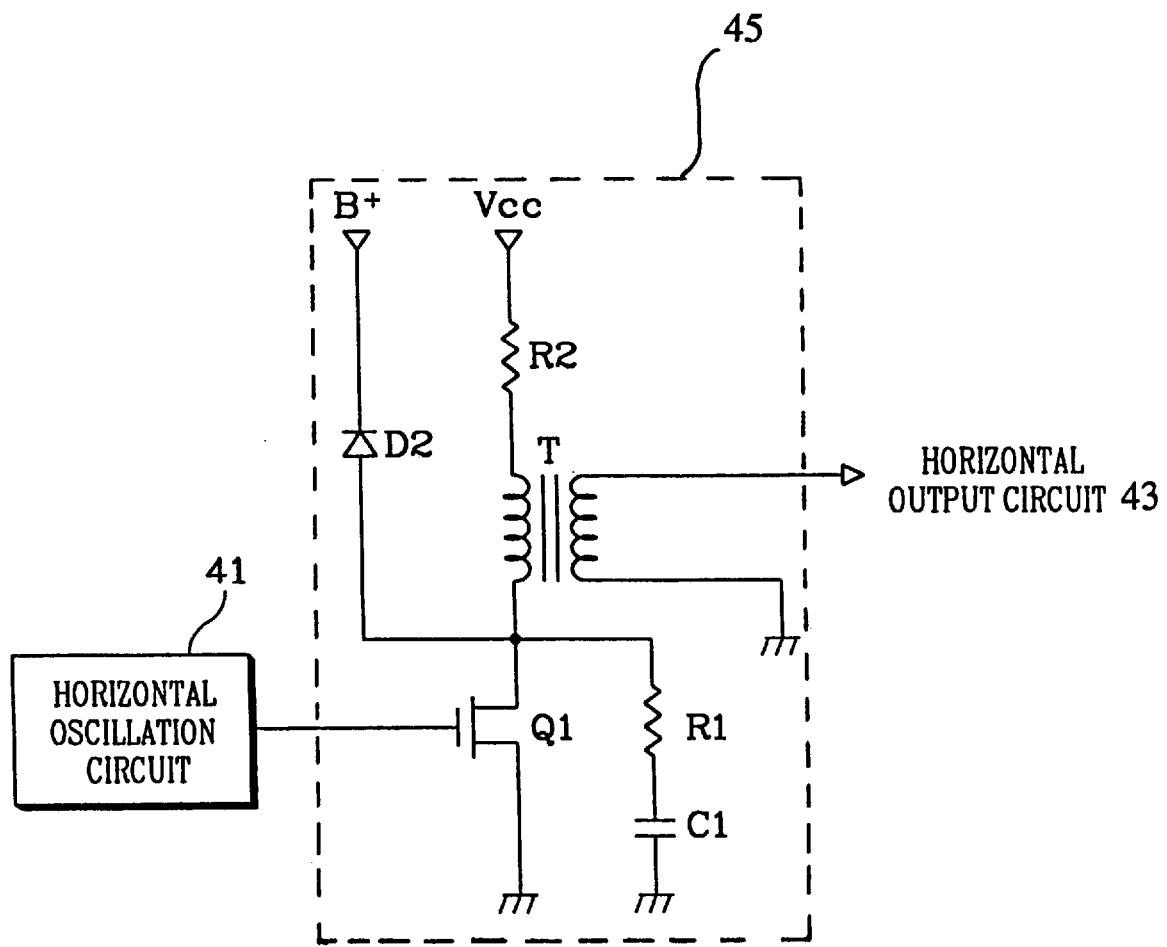
FIG. 4 illustrates a horizontal drive circuit according to an embodiment of the present invention.

According to an embodiment of the present invention, the horizontal oscillation circuit 41, the horizontal output circuit 43 and the horizontal size controller 44 of the horizontal deflection circuit 40 are the same as shown in FIG. 2. As shown in FIG. 4, a horizontal drive circuit 45 according to the embodiment of the present invention differs from the horizontal drive circuit 42 of the conventional horizontal deflection circuit 40.

The horizontal drive circuit 45 according to the embodiment of the present invention includes an FET Q1, and an R-C circuit, a resistor R2, a transformer T, and a diode D2. The gate of the FET Q1 is connected to the output of the horizontal oscillation circuit (or "horizontal oscillator") 41. The R-C circuit includes a resistor R1 and a capacitor C1 for regulating the peak pulse of the switching signal generated by the FET Q1. The resistor R2 introduces a source voltage Vcc. The transformer T induces the source voltage Vcc, supplied through the resistor R2, according to the switching signal of the FET Q1. The peak pulse of the switching signal is regulated by the R-C circuit which includes the resistor R1 and the capacitor C1. The diode D2, which serves as protecting means, has an anode thereof connected, at a node, to a primary winding of the transformer T and to the drain of the FET Q1. A secondary winding of the transformer T is connected to the horizontal output circuit 43. The source of the FET Q1 and the end of the capacitor C1 other than the one connected to the resistor R1 are connected to ground.

Figure 3:
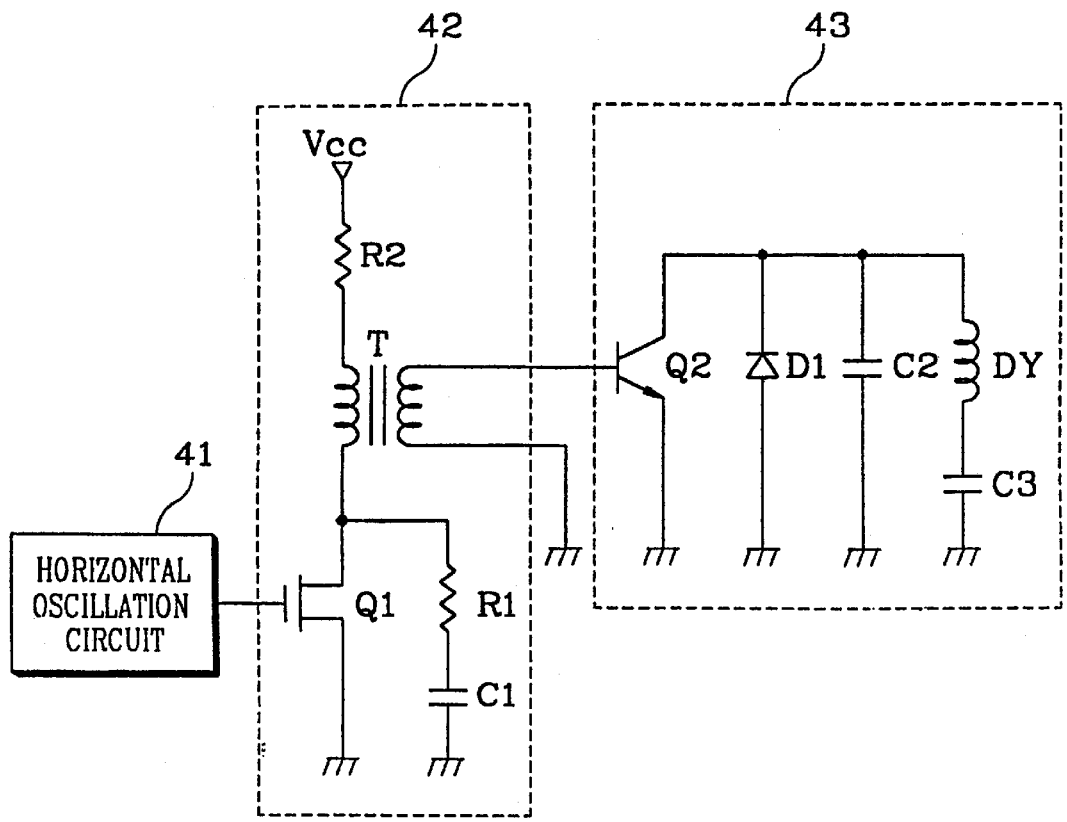
FIG. 3 illustrates a conventional horizontal drive circuit and horizontal output circuit.

The output of the horizontal oscillator 41 is supplied to the gate of the FET Q1. The FET Q1 switches according to the output of the horizontal oscillator 41. If a higher voltage than a voltage B+ is supplied to the drain of the FET Q1 from the source voltage Vcc and through the resistor R2 and the primary winding of the transformer T, that higher voltage will be bypassed through the diode D2. The diode D2, acting as a surge protector makes it possible to forego the use of a high performance transistor for surge protection. If the voltage supplied from the source voltage Vcc and through the resistor R2 and the primary winding of the transform T is lower than the voltage B+, then like the conventional horizontal drive circuit shown in FIG. 3, the transformer T induces the source voltage Vcc, supplied through the resistor R2, according to the switching signal of the FET Q1.

As mentioned above, the horizontal drive circuit of the present invention can protect the drive switching transistor from surge destruction. This surge protection function is accomplished just by connecting a surge protect diode to the primary winding of the horizontal drive transformer.

Although a preferred embodiment of the present invention has been shown and described, it will be appreciated by those skilled in the art that changes may be made in this embodiment without departing from the principles and spirit of the invention, the scope of which is defined solely by the claims appended hereto and the equivalents of the subject matter defined thereby.

What is claimed is:

1. A horizontal drive circuit for a video display, comprising:

switching means for switching according to a horizontal oscillation frequency generated by a horizontal oscillator;

a driving transformer having a primary winding connected to said switching means and a secondary winding, said secondary winding providing an amplified current according to a state of said switching means; and a surge protector connected between said switching means and the primary winding of said driving transformer.

2. The horizontal drive circuit as defined in claim 1, wherein said surge protector is a diode.

3. A video display drive circuit, switched by a switching device according to an oscillation frequency generated by an oscillator, said video drive circuit comprising:

a driving transformer including a secondary winding and a primary winding coupled to the secondary winding and to the switching device, the secondary winding providing an amplified current based on a state of the switching device; and a surge protector connected between the switching device and the primary winding of said driving transformer.

4. The video drive circuit as defined in claim 3, wherein said surge protector comprises a diode.

5. The horizontal drive circuit as defined in claim 2, wherein the diode is reverse biased with a predetermined bias voltage.

6. The video drive circuit as defined in claim 4, wherein the diode is reverse biased with a predetermined bias voltage.

7. The horizontal drive circuit as defined in claim 1, wherein said switching means comprises a transistor.

8. The video drive circuit as defined in claim 3, wherein the switching device comprises a transistor.

9. The horizontal drive circuit as defined in claim 7, wherein the transistor is a field effect transistor.

10. The video drive circuit as defined in claim 8, wherein the transistor is a field effect transistor.

11. The horizontal drive circuit as defined in claim 1, further comprising a regulating device connected to the primary winding, said switching means, and said surge protector, said regulating device regulating a peak pulse of a switching signal generated by said switching means.

12. The video drive circuit as defined in claim 3, flier comprising a regulating device connected to the primary winding, the switching device, and said surge protector, said regulating device regulating a peak pulse of a switching signal generated by the switching device.

13. The horizontal drive circuit as defined in claim 11, wherein said regulating device comprises an R-C circuit.

14. The video drive circuit as defined in claim 12, wherein said regulating device comprises an R-C circuit.

15. A horizontal drive circuit, coupled to a horizontal oscillator in a video display and receiving therefrom a signal representing a horizontal oscillation frequency, said horizontal drive circuit comprising:

a switching device switching according to the horizontal oscillation frequency;

a driving transformer having a primary winding and a secondary winding providing an amplified current according to a state of said switching device, the primary winding being connected to said switching device at a node and coupled to the secondary winding; and a surge protector connected to the node between said switching device and the primary winding of said driving transformer.

16. The horizontal drive circuit as defined in claim 15, wherein said surge protector comprises a diode.

17. The horizontal drive circuit as defined in claim 16, wherein the diode is reversed biased with a predetermined bias voltage.

18. A video surge protection method, comprising:

generating an amplified current from a secondary transformer winding according to a switching signal, generated by a switching device, by energizing a primary transformer winding coupled to the secondary transformer winding based on the switching signal; and bypassing away from a terminal of the switching device a voltage applied to the primary transformer winding when the voltage exceeds a predetermined voltage.

19. The video surge protection method as defined in claim 18, wherein the bypassing operation includes applying a bias voltage equal to the predetermined voltage to a diode coupled to a node between the switching device and the primary transformer winding.

20. A horizontal surge protection method, comprising:

supplying a first output signal from an oscillator to an input terminal of a switching device to generate a switching signal;

inducing a source voltage for generating an amplified current from a secondary transformer winding according to the switching signal; and bypassing a voltage away from an output terminal of the switching device when the voltage exceeds a predetermined voltage.

21. A video display, comprising:

a cathode ray tube;

a vertical deflection circuit coupled to said cathode ray tube and performing vertical deflections therefor responsive to a vertical synchronizing signal; and a horizontal deflection circuit coupled to said cathode ray tube and performing horizontal deflections therefor responsive to a horizontal synchronizing signal, said horizontal deflection circuit comprising a horizontal oscillator generating a frequency signal indicating a horizontal oscillation frequency, a horizontal output circuit generating a sawtooth current responsive to a voltage level supplied thereto, and a horizontal drive circuit coupled between the horizontal oscillator and the horizontal output circuit, receiving the frequency signal, and generating the voltage level supplied to the horizontal output circuit, the horizontal drive circuit comprising a switching device switching according to the horizontal oscillation frequency, a driving transformer having a primary winding and a secondary winding providing an amplified current according to a state of the switching device, the primary winding being connected to the switching device at a node and coupled to the secondary winding, and a surge protector connected to the node between the switching device and the primary winding of the driving transformer.

* * * * *